United States Patent [19]
Banker

[11] Patent Number: 5,184,736
[45] Date of Patent: Feb. 9, 1993

[54] TAPE RACK MOUNTING DEVICE

[75] Inventor: Harold J. Banker, Glassboro, N.J.

[73] Assignee: Ner Data Products Inc., Stamford, Conn.

[21] Appl. No.: 848,905

[22] Filed: Mar. 9, 1992

[51] Int. Cl.⁵ .............................................. A47F 5/00
[52] U.S. Cl. ...................................... 211/41; 211/40; 211/59.4; 211/126
[58] Field of Search ................... 211/40, 41, 59.4, 189, 211/49.1, 126, 133

[56] References Cited

U.S. PATENT DOCUMENTS

| | | | |
|---|---|---|---|
| 4,741,438 | 5/1988 | Mastronardo et al. | 211/40 X |
| 4,782,958 | 11/1988 | Price et al. | 211/41 |
| 4,815,295 | 3/1989 | Accumanno | 211/40 X |
| 4,832,195 | 5/1989 | Dahl | 211/40 X |
| 4,846,355 | 7/1989 | Price, Sr. et al. | 211/41 |
| 4,900,107 | 2/1990 | Long et al. | 211/41 X |
| 5,072,838 | 12/1991 | Price, Jr. et al. | 211/41 X |
| 5,090,579 | 2/1992 | Major | 211/126 |

Primary Examiner—Robert W. Gibson, Jr.
Attorney, Agent, or Firm—Caesar, Rivise, Berstein, Cohen & Pokotilow, Ltd.

[57] ABSTRACT

A storage rack mounting device for releasably storing a plurality of tape storage compartments or modules therein. The storage compartments are utilized to hold a plurality of tapes, sch as computer tapes, therein. The rack includes a frame to hold a plurality of tape storage compartments and comprises two opposed sidewalls spaced apart to receive the tape storage compartments therebetween. Upper and lower mounting flanges extend outwardly from the interiors of each of the sidewalls to hold therebetween the tape storage compartment and to permit the tape storage compartment to be introduced and removed from the frame. The storage compartments have two sidewalls, at least one of which has an opening therethrough and a peripheral edge thereabout to releasably engage a locking flange which extends rearwardly and outwardly at an angle from the interior of the sidewall. The storage compartments are slid into place in between the upper and lower mounting flanges until the locking flange engages the peripheral edge of the opening in the sidewall of the compartment. In a preferred embodiment, the frame is free standing and angles outwardly near the base to aid in storing and retrieving tapes.

13 Claims, 4 Drawing Sheets

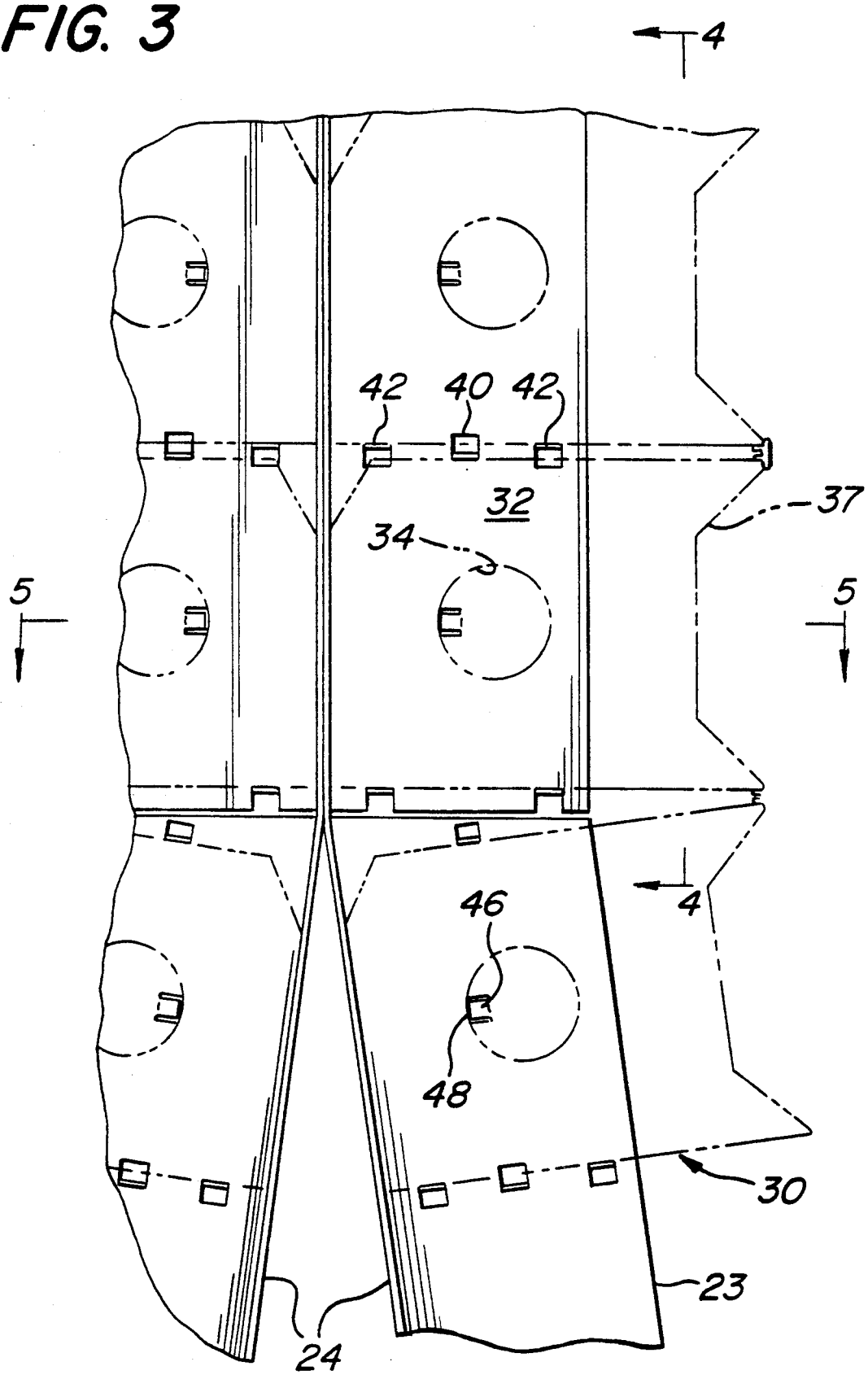

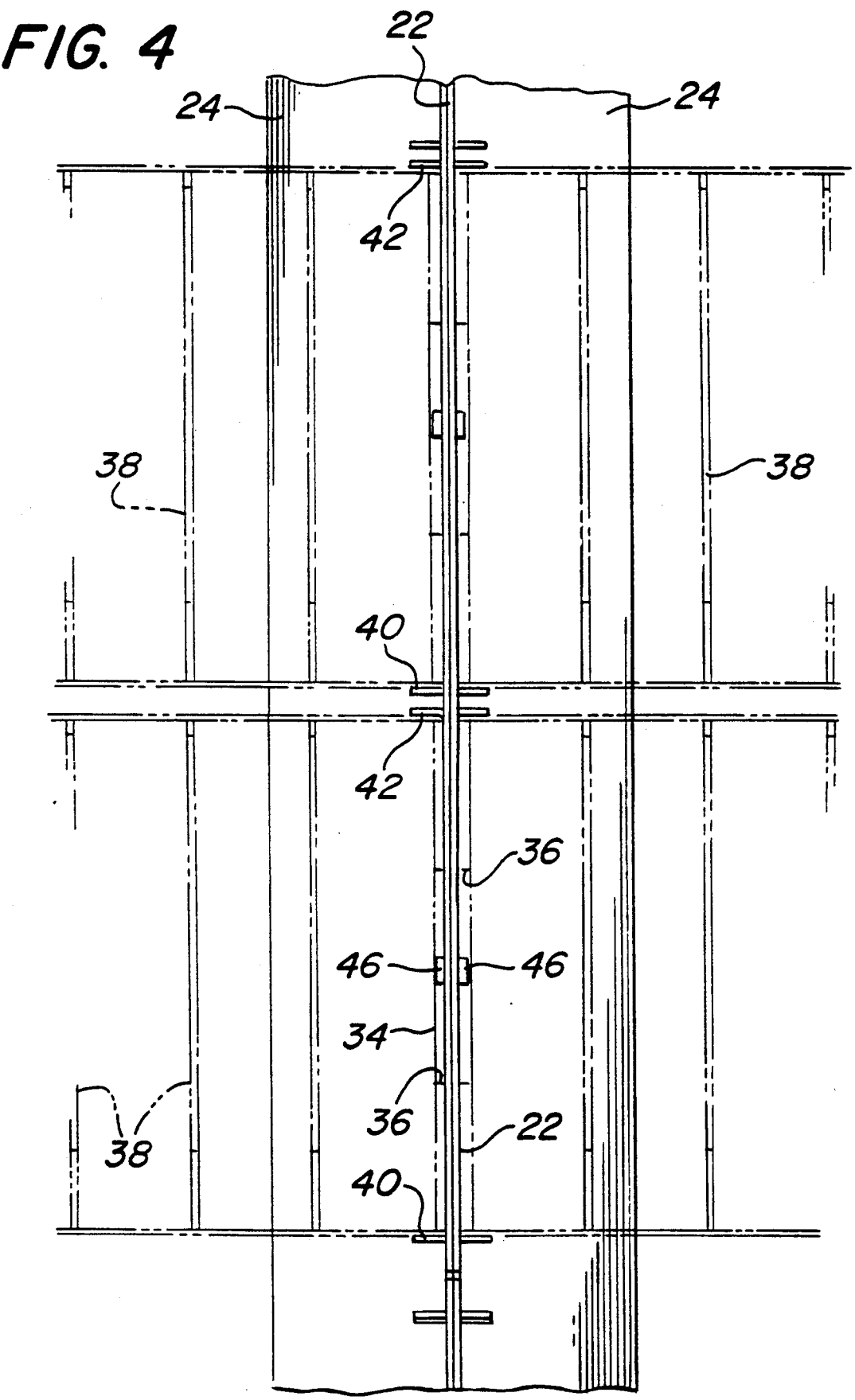

TAPE RACK MOUNTING DEVICE

FIELD OF THE INVENTION

This invention relates generally to a rack to releasably hold a plurality of tape storage compartments or modules which hold a plurality of tapes, such as computer tapes, for storage and easy access.

BACKGROUND OF THE INVENTION

In today's business world, computers play a vital role in data compilation, analysis and storage, thereby facilitating data management and business operations. As a result, such entities usually acquire a large number of computer tape cartridges, such as the more commonly known "3480" tape cartridge, thereby permitting safe storage of information on the magnetic tape contained therein.

An important need therefore arises for a tape cartridge storage device which compactly stores a plurality of cartridges, yet permits their easy retrieval and return to the storage system. While a wide variety of devices and systems for transporting and storing tape cartridges have been developed, they apparently have suffered from various drawbacks.

In U.S. Pat. No. 4,688,860 (Accumanno et al.) is disclosed a rolling truck for use in transporting tape cartridges to and from a tape cartridge storage system. The truck has four-sided means having a plurality of individual housing units thereon for holding a plurality of tapes. The tape holding means are rotatably mounted so that the operator may readily access the desired tape.

Patents related to the above patent include U.S. Pat. No. 4,815,795 (Accumanno et al.) in which is disclosed a holder for tape cartridges which has an upper and lower section which are divided by partitioned means extending between and integral with the pair of opposite end walls. Further, in related U.S. Pat. No. 4,844,564 (Price, Sr. et al.) is disclosed a storage device having an integrally mounted housing having both an upper and lower section which are formed by partitioned means extending between and integral with the opposing end wall portions. The device further comprises a separate resilient force supplying means secured to the back wall portion of the upper and lower sections for applying a resilient force to the tape cartridge in each of the compartments to urge one portion of the tape cartridge into contact with the lip means and another portion of the tape cartridge into contact with the top wall portion of the partitioned means.

Additional tape storage systems are disclosed in U.S. Design Pat. Nos. 300,287 (Price et al.) and 300,288 (Price et al.).

Other storage systems and carriers for a variety of types of tapes are disclosed in U.S. Pat. Nos. 3,811,745 (Cylke), 3,862,787 (Hilsinger), 4,239,109 (Nielsen et al.), 4,300,809 (Brownlee), and 4,549,775 (Carter).

In addition, another type of tape storage device and system which utilizes individual tape storage compartments or modules which can be releasably secured to a frame is disclosed in currently pending U.S. application Ser. No. 07/652,803 filed on Feb. 7, 1991, entitled TAPE STORAGE DEVICE AND SYSTEM, the entire disclosure of which is incorporated by reference herein.

However, a need exists for a tape storage rack to be used to releasably store a plurality of tape compartments which overcomes the disadvantages of the prior art.

OBJECTS OF THE INVENTION

Accordingly, it is a general object of this invention to provide a tape storage rack which overcomes the disadvantages of the prior art.

It is another object of this invention to provide a tape storage rack which permits the compact storage of tape cartridges.

It is yet another object of this invention to provide a tape storage rack which permits the easy removal and retrieval of individual tape storage compartments or modules without a concomitant loss in storage space efficiency.

It is yet a further object of this invention to provide a tape storage rack which is easy and inexpensive to manufacture, install and maintain.

It is another object of this invention to provide a tape storage device and system which is aesthetically pleasing.

It is yet another object of this invention to provide a tape storage rack which is free standing.

It is another object of this invention to provide tape storage compartments which are easily, inexpensively and securely mounted in a frame.

It is still a further object of this invention to provide a tape storage rack which is readily adaptable to the various conditions of use.

SUMMARY OF THE INVENTION

These and other objects of this invention are achieved by providing a storage rack mounting device for releasably storing a plurality of tape storage compartments or modules therein. The storage compartments are utilized to hold a plurality of tapes, such as computer tapes, therein.

The rack includes a frame to hold a plurality of tape storage compartments and comprises two opposed sidewalls spaced a distance apart to receive the tape storage compartments therebetween. Upper and lower mounting flanges extend outwardly from the interiors of each of the sidewalls to hold therebetween the tape storage compartment and to permit the tape storage compartment to be introduced and removed from the frame. Each storage compartment has two sidewalls, at least one of which has an opening therethrough and a peripheral edge thereabout to releasably engage a locking flange which extends outwardly at an angle from the interior of the sidewall. The storage compartments are slid into place in between the upper and lower mounting flanges until the locking flange engages the peripheral edge of the opening in the sidewall of the compartment. In a preferred embodiment, the frame is free standing and angles outwardly near the base to aid in storing and retrieving tapes.

DESCRIPTION OF THE DRAWINGS

Other objects and many attendant features of this invention will become readily appreciated as the same becomes better understood by reference to the following detailed description when considered in connection with the accompanying drawing wherein:

FIG. 3 is an enlarged side elevational view of the vertical frame portion of the present invention at the point where the frame is angled away from the longitudinal axis of the vertical frame;

FIG. 4 is an enlarged, elevational, partial cross-section view of the vertical frame containing multiple storage compartment modules shown in phantom, held within the vertical frame, taken along line 4—4 of FIG. 3.

DETAILED DESCRIPTION OF THE PREFERRED EMBODIMENT

Figure 1:
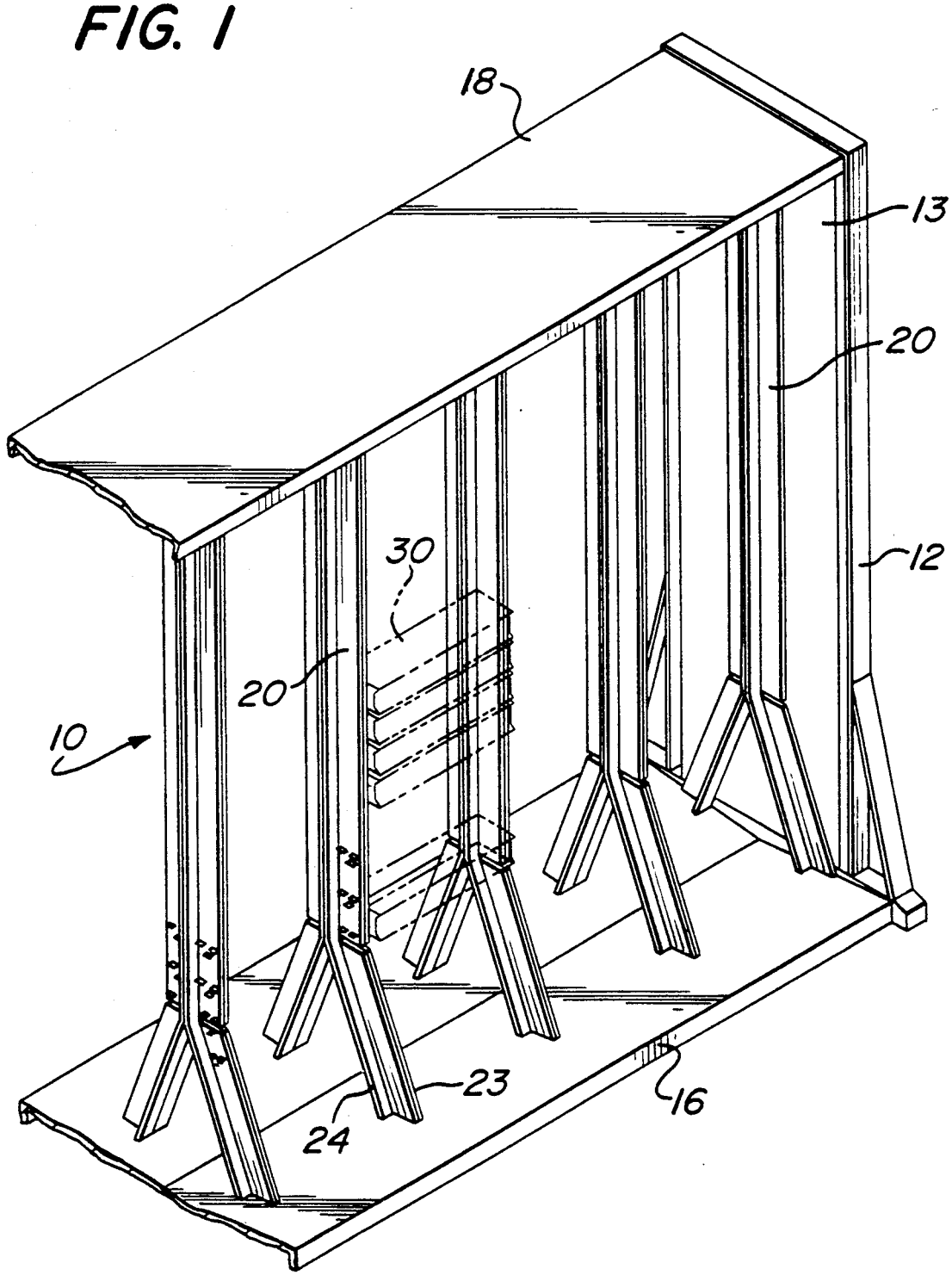
FIG. 1 is a partial isometric view, of the storage rack of the present invention with the removable storage compartment modules shown in phantom.

Referring now to the various figures of the drawing wherein like reference numerals refer to like parts, there is shown in FIG. 1, a storage rack mounting device 10 which releasably holds a plurality of storage compartments or modules 30. The modules 30 hold a plurality of tapes (not shown), such as computer tapes, therein. An outer frame 12 is secured to a horizontal base 16 and top 18 to support vertical opposed sidewalls 20 suitably spaced to releasably receive the modules 30.

Figure 2:
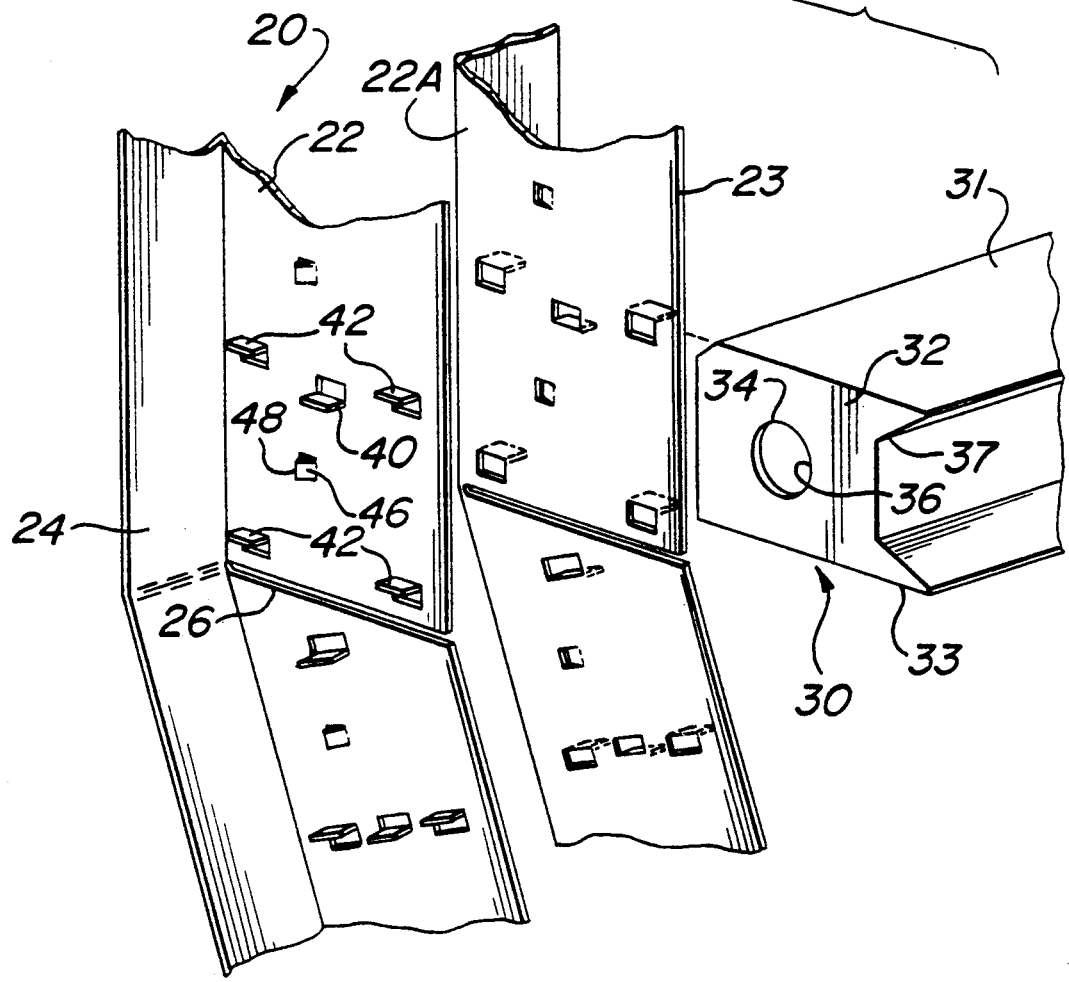
FIG. 2 is an enlarged, partial isometric view of the vertical frame and including flanges, shown with a storage compartment module positioned between the flanges.

As shown in FIG. 2, upper and lower mounting flanges 40 and 42 respectively, extend outwardly from the interiors 22 of each of the sidewalls 20 to hold the modules 30. The modules 30 have a sidewall 32, an opening therethrough 34 and a peripheral edge 36 thereabout to releasably engage a locking flange 46 which extends outwardly at an angle from the sidewall interior 22. The locking flange is urged inwardly of the sidewalls when the module 30 is slid between the sidewalls 20 (FIG. 3) and snaps out of the sidewalls when the opening 34 at the ends of the module are aligned with the locking flanges.

Referring now to the details of the frame 12, in FIG. 1, the frame 12 is free standing and includes an end wall 13, a base 16 and a top 18, and may be constructed of conventional materials such as steel, aluminum, wood, etc. depending upon the circumstances of use. The frame 12 provides support for the sidewalls 20 which mount and hold the modules 30. The sidewalls 20 are secured about the frame 12 by conventional means.

As seen in FIG. 2, the sidewalls 20 are vertically oriented and include an interior surface 22 and an exterior surface 22A. Two opposed sidewalls 20 are spaced apart in accordance with the width of the modules 30 to house the modules 30. When a plurality of opposed sidewalls are utilized as shown in FIG. 1, the exterior surfaces 22A of two sidewalls 30 abut one another in a mirror image fashion to maximize the number of modules 30 which can be contained within a given space, however it should be readily apparent to those skilled in the art that the sidewalls 30 need not abut each other.

As shown in FIG. 2, the sidewalls 20 may additionally have a rear retaining wall 24 integrally formed therewith and generally perpendicular thereto. The rear wall 24 also aids in holding the modules 30 in the device when they are slid into place. In a preferred embodiment, as seen in FIGS. 1 and 2, the sidewalls 20 are angled outwardly from the longitudinal axis thereof near the base 16, to aid in viewing and accessing the modules 30 and tapes (not shown) stored therein. Since the sidewalls are preferably integrally formed to minimize manufacturing costs and provide ease of assembly, a slit 26 is made in the sidewall and the rear wall 24 is bent to the desired angle as shown in FIG. 3.

Figure 5:
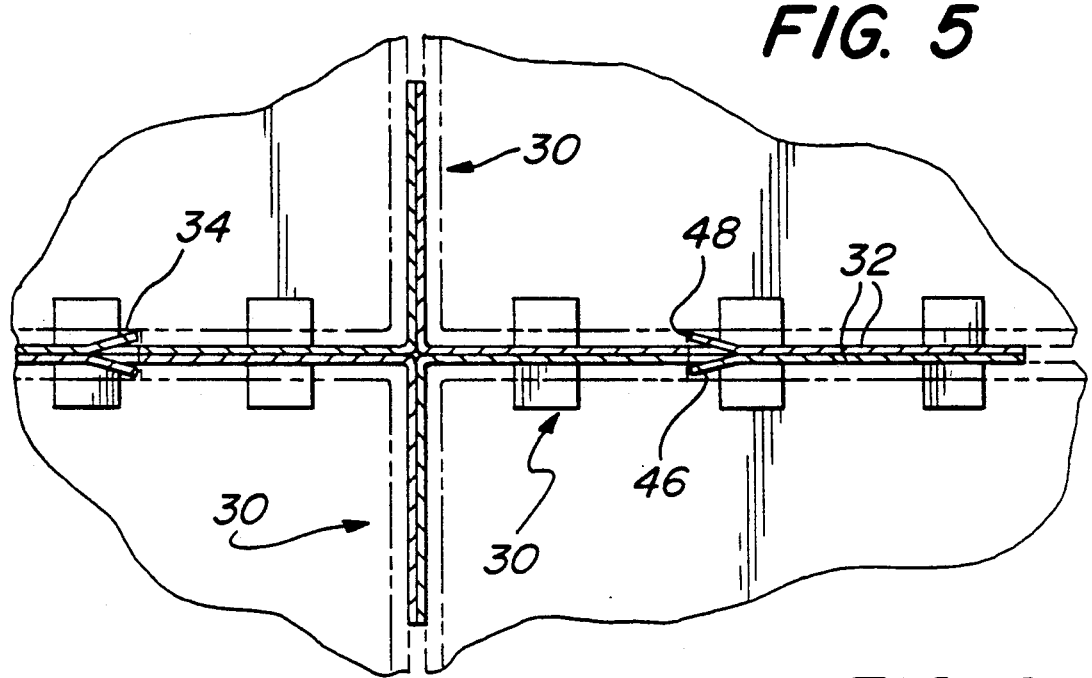
FIG. 5 is an enlarged, partial cross-section view of the vertical frame, shown with a locking tab engaging the respective hole in the side wall of the storage compartment module, taken along line 5—5 of FIG. 3.

As seen in FIGS. 2 and 5, in order to support and releasably lock the modules into place, a series of flanges are provided. The module 30 rests upon lower flanges 42 and is further held by upper flange 40. The flanges 40 and 42 are adjacent the upper wall 31 and lower wall 33 of the module respectively, when the module is slid in between the opposed sidewalls 20. The flanges 40 and 42 are suitably spaced to permit the module 30 to slide therebetween. In the preferred embodiment, two lower flanges 42 and one upper flange 40 are utilized, although it should be readily apparent to those skilled in the art that more flanges may be utilized. The use of two flanges on each side to support the lower surface of the module further acts to stabilize the module in the frame. In a preferred embodiment, the flanges 40 and 42 are integrally formed with the sidewalls 20 to minimize manufacturing costs and are generally perpendicular thereto.

As shown in FIGS. 2 and 5, in order to releasably lock the module 30 between the sidewalls 20, a locking flange 46 is provided on the sidewall interior 22, which is also preferably integrally formed therewith. The locking flange 46 extends outwardly at an angle towards the rear wall 24. The end 48 of the flange 46 engages the peripheral edge 36 of the sidewall opening 34 of the module 30 when the module is slid into place. To release the module 30 from the sidewalls 20, each of the locking flange 46 is pressed towards the sidewall to which it is secured and the module is slid outwardly until the opening 34 passes over the flanges 48.

In a preferred embodiment, the module opening 34 is circular to permit air to circulate between the tapes during storage and to facilitate ease of handling of the individual storage modules. Further details of one of the types of modules which may be utilized with the present invention are disclosed in co-pending application Ser. No. 07/652,803. As shown in FIG. 4, the modules may be partitioned by partitioning walls 38 into the desired number of sections. The modules, are preferably comprised of a one-piece injection molded non-breakable thermo plastic resin. Additionally, as shown in FIG. 2, the front portion of each of the sidewalls 32 is cut out at 37 to provide a recessed edge to enable a person to easily grasp a tape (not shown) at either end of the module 30 and which preferably extends beyond the front edge 23 of the sidewall 22. Thus a new and improved storage rack is shown which is easy to use, has excellent storage capacity and is easily assembled. The rack is dimensioned so that the frontal area maximizes the number of tape cartridges which can be stored. In addition, due to its construction, it may be readily and inexpensively manufactured.

Without further elaboration the foregoing will so fully illustrate my invention that others may, by applying current or future knowledge, adopt the same for use under various conditions of service.

I claim:

1. A storage rack mounting device for releasably storing a plurality of tape storage compartments therein, each of the compartments comprising two sidewalls having an opening therethrough and a peripheral edge thereabout, the storage rack mounting device comprising:

(a) a frame to hold a plurality of tape compartments therein, the frame comprising at least two opposed sidewalls, each having an interior surface, the sidewalls being spaced apart to receive each of the tape storage compartments therebetween;

(b) means for supporting the tape storage compartment within the frame and for permitting the tape storage compartment to be introduced and removed from the frame comprising at least one flange extending outwardly from the interior surface of each of the side walls; and (c) means for releasably locking each of the storage compartments within the frame comprising at least one locking flange secured to the interior surface of at least one of the sidewalls and extending angularly therefrom to engage the peripheral edge.

2. The device of claim 1 wherein the frame additionally comprises a base secured to the two opposed sidewalls of the frame so that the two opposed sidewalls are vertically oriented with respect to the base.

3. The device of claim 1 wherein each of the two opposed sidewalls additionally comprises a vertically oriented top section and an angled base section, the angled base section extending outwardly from the longitudinal axis of the top section.

4. The device of claim 1 wherein the storage compartment includes a bottom wall and a top wall having an upper surface and the at least one flange comprises:

(a) at least one lower flange for supporting the bottom wall of the storage compartment; and (b) an upper flange spaced above the at least one lower flange to permit the storage compartment to be received therebetween.

5. The device of claim 4 wherein the at least one lower flange comprises two flanges.

6. The device of claim 4 wherein each of the at least one flanges is formed integrally with the sidewalls.

7. The device of claim 4 wherein each of the at least one flanges is generally perpendicular to the sidewalls.

8. The device of claim 1 wherein each of the sidewalls additionally comprises a front and rear edge, and the locking flange is formed integrally with the sidewall and extends rearwardly.

9. The device of claim 1 wherein each of the two opposed sidewalls additionally comprises a front and rear edge and a rear wall extending generally from the rear edge towards an adjacent sidewall.

10. The device of claim 8 wherein each of the two opposed sidewalls additionally comprises a front and rear edge and a rear wall extending generally from the rear edge towards an adjacent sidewall.

11. The device of claim 1 wherein the opening is circular.

12. The device of claim 2 wherein the frame additionally comprises a top section secured to the side walls opposite the base.

13. A storage rack mounting device for releasably storing a plurality of tape storage compartments therein, each of the compartments comprising two sidewalls having an opening therethrough and a peripheral edge thereabout, the storage rack mounting device comprising:

(a) a frame to hold a plurality of tape storage compartments therein, the frame comprising at least two opposed sidewalls, each having an interior surface, the sidewalls being spaced apart to receive each of the tape storage compartments therebetween;

(b) two supporting flanges for supporting the tape storage compartment within the frame, the two supporting flanges being located on the interior surface of each of the at least two opposed sidewalls and extending outwardly therefrom;

(c) an upper flange located on the interior surface of each of the at least two opposed sidewalls and extending outwardly therefrom and being spaced a distance apart from the two supporting flanges to permit the insertion of a storage compartment therebetween; and (d) a locking flange, located on the interior surface of each of the at least two opposed sidewalls between the two supporting flanges and the upper flange and extending outwardly and rearwardly from the interior surface.

* * * * *